(12) United States Patent
Kawashima

(10) Patent No.: US 8,948,944 B2
(45) Date of Patent: Feb. 3, 2015

(54) HYBRID-TYPE CONSTRUCTION MACHINE

(75) Inventor: Koji Kawashima, Kanagawa (JP)

(73) Assignees: Sumitomo Heavy Industries, Ltd., Tokyo (JP); Sumitomo (S.H.I.) Construction Machinery Co., Ltd., Tokyo (JP)

( * ) Notice: Subject to any disclaimer, the term of this patent is extended or adjusted under 35 U.S.C. 154(b) by 412 days.

(21) Appl. No.: 13/575,378

(22) PCT Filed: Jan. 29, 2010

(86) PCT No.: PCT/JP2010/051219
§ 371 (c)(1),
(2), (4) Date: Jul. 26, 2012

(87) PCT Pub. No.: WO2011/092837
PCT Pub. Date: Aug. 4, 2011

(65) Prior Publication Data
US 2012/0296510 A1    Nov. 22, 2012

(51) Int. Cl.
*B60L 9/00*    (2006.01)
*F02D 29/06*   (2006.01)
*B60W 10/06*   (2006.01)
*B60W 10/08*   (2006.01)
(Continued)

(52) U.S. Cl.
CPC ............... *F02D 29/06* (2013.01); *B60K 6/445* (2013.01); *B60K 6/20* (2013.01); *B60W 10/06* (2013.01); *B60W 10/08* (2013.01); *B60W 10/30* (2013.01); *B60W 20/00* (2013.01); *B60W 30/1884* (2013.01); *B60W 30/1888* (2013.01); *B60Y 2200/25* (2013.01); *B60Y 2200/412* (2013.01); *E02F 9/123* (2013.01); *E02F 9/2075* (2013.01); *E02F 9/2091* (2013.01); *E02F 9/2246* (2013.01); *F02D 29/04* (2013.01); *Y02T 10/6286* (2013.01)
USPC .............................. 701/22; 701/50; 320/104

(58) Field of Classification Search
CPC ..... B60W 20/00; B60W 10/08; B60W 10/06; Y02T 10/6286; B60K 6/445
USPC ............ 701/22, 50; 903/903, 902, 907; 180/65.275, 62.21, 65.26, 65.21, 53.8; 320/104; 37/348
See application file for complete search history.

(56) References Cited

U.S. PATENT DOCUMENTS 8,285,434 B2 * 10/2012 Yanagisawa et al. ........... 701/22
2003/0132729 A1 *  7/2003 Yoshimatsu .................. 320/104
2010/0280697 A1 * 11/2010 Yanagisawa et al. ........... 701/22

FOREIGN PATENT DOCUMENTS

| JP | 2001-012274 | 1/2001 |
| JP | 2004-011502 | 1/2004 |
| JP | 2005-086892 | 3/2005 |
| JP | 2009-216058 | 9/2009 |

OTHER PUBLICATIONS

International Search Report mailed on May 18, 2010.

* cited by examiner

Primary Examiner — Behrang Badii
(74) Attorney, Agent, or Firm — IPUSA, PLLC

(57) ABSTRACT

A hybrid-type construction machine includes: an engine to drive a variable-volume-type hydraulic pump; a plurality of hydraulic actuators driven by a hydraulic pressure from the variable-volume-type hydraulic pump; and a motor generator driven by an electric power from an electric power accumulator to assist the engine. A maximum output of the variable-volume-type hydraulic pump is equal to or larger than a maximum output of the engine. When operating by setting an output of the variable-volume-type hydraulic pump larger than the maximum output of the engine, the engine is assisted by the motor generator.

13 Claims, 11 Drawing Sheets

(51) Int. Cl.
*B60W 10/30* (2006.01)
*B60W 30/188* (2012.01)
*E02F 9/20* (2006.01)
*E02F 9/22* (2006.01)
*F02D 29/04* (2006.01)
*B60K 6/445* (2007.10)
*B60K 6/20* (2007.10)
*B60W 20/00* (2006.01)
*E02F 9/12* (2006.01)

HYBRID-TYPE CONSTRUCTION MACHINE

TECHNICAL FIELD

The present invention relates to a construction machine and, more particularly, to a hybrid-type construction machine in which an engine for driving a hydraulic pump is assisted by an electric motor.

BACKGROUND ART

A hybrid-type construction machine, which operates using both a power of an internal combustion engine and a power of an electric motor, has been developed and used. As a hybrid-type construction machine, there is known an example which takes a drive mode of a so-called parallel system.

In the parallel system drive mode, a hydraulic pump and a drive machine, which has a generator function and a motor function, are connected in parallel to an internal combustion engine (engine) as a common power source. Hydraulic actuators are driven by the hydraulic pump, and a power accumulation device is charged according to the generator function of the drive machine. The drive machine is operated as an electric motor by being supplied with an electric power from the power accumulation device in order to assist the engine. It should be noted that, as a drive machine, there is a case where a combined machine (generator and motor) having both a generator function and a motor function is used, and a case where a generator and a motor, which are separated from each other, are used in combination.

In the above-mentioned hybrid-type construction machine, the hydraulic pump is driven by, for example, an internal combustion engine (engine), such as a diesel engine, a gasoline engine, etc. Because a maximum output of an internal combustion engine is determined by a number of revolutions of the internal combustion engine at that time, an upper limit value corresponding to a number of revolutions is set to the output of the internal combustion engine. Accordingly, if a power requested by the hydraulic pump to the engine exceeds the upper limit value determined by the number of revolutions of the internal combustion engine at that time, it is not possible to output the requested power.

Therefore, in a hybrid-type construction machine, if a power requested by the hydraulic pump to the engine exceeds the upper limit value, a drive machine is used as a motor to assist an engine to compensate for an output corresponding to a portion exceeding the upper limit value. As mentioned above, the hybrid-type construction machine has an advantage in that a rated output of an engine can be reduced because there is an assist by an electric motor.

For example, it is suggested to use an engine having a small rated output and obtain a necessary hydraulic output by assisting the engine by an electric motor when a large hydraulic output is required (for example, refer to Japanese Laid-Open Patent Application No. 2004-11502).

However, if an assist by the motor is continuously performed, or frequently performed, it becomes difficult to maintain a state of charge of a battery for driving the electric motor. Thus, a control is performed so as to use the engine effectively as much as possible to prevent an excessive use of battery power by setting a power of the hydraulic pump to be lower than a rated output of the engine. Alternatively, an assist by the motor is suppressed by controlling the output of the hydraulic pump to be reduced in response to the state of charge of the battery.

SUMMARY OF THE INVENTION

Problems to be Solved by the Invention

As mentioned above, when the output of the hydraulic pump is reduced or the output of the hydraulic pump is suppressed, a hydraulic output supplied from the hydraulic pump to a hydraulic actuator is reduced, which causes a problem in that an operation becomes slow or a powerful feel is lost. Moreover, there may be a case where a hydraulic output is suddenly reduced and a desired operation cannot be performed because an operator cannot know when the hydraulic output is reduced due to a decrease in a state of charge of a battery.

The present invention was made in view of the above-mentioned problems, and it is an object to provide a hybrid-type construction machine which can perform a hydraulic operation by temporarily increasing an output of a hydraulic pump.

Means to Solve the Problem

In order to achieve the above-mentioned objects, there is provided according to the present invention a hybrid-type construction machine, including: an engine to drive a variable-volume-type hydraulic pump; a plurality of hydraulic actuators driven by a hydraulic pressure from the variable-volume-type hydraulic pump; and a motor generator driven by an electric power from an electric power accumulator to assist the engine, wherein a maximum output of the variable-volume-type hydraulic pump is equal to or larger than a maximum output of the engine, and when operating by setting an output of the variable-volume-type hydraulic pump larger than the maximum output of the engine, the engine is assisted by said motor generator.

In the above-mentioned hybrid-type construction machine, it is preferable that in a case where the hydraulic actuator to be driven is a hydraulic actuator capable of performing a continuous operation, the output of the variable-volume-type hydraulic pump is set to a first output equal to or smaller than the maximum output of the engine. Moreover, it is preferable that in a case where the hydraulic actuator to be driven is a hydraulic cylinder, the output of the variable-volume-type hydraulic pump is set to a second output larger than the maximum output of the engine. Moreover, it is preferable that an output of the variable-volume-type hydraulic pump is set based on presence or absence of an operation of each of the hydraulic actuators. Moreover, in a case where only one of the hydraulic actuator is operating, an output of the variable-volume-type hydraulic pump may be set to a second output larger than the maximum output of the engine. An output of the variable-volume-type hydraulic pump may be set based on a driving direction of each of the hydraulic actuators.

Moreover, the above-mentioned hybrid-type construction machine may include a boom and an arm driven by the hydraulic actuators, wherein an output of the variable-volume-type hydraulic pump may be set based on driving directions of the boom and the arm. Further, in a case where the hydraulic actuators are not driven, an output of the variable-volume-type hydraulic pump may be set to a value smaller than the maximum output of said engine. Additionally, a kind and an operating condition of the hydraulic actuators may be determined based on a lever operation of an operator.

Effect of the Invention

According to the above-mentioned invention, when a hydraulic actuator to drive is only a hydraulic cylinder, an output of a hydraulic pump is temporarily increased, which enables performing a hydraulic operation with a large power. For this reason, an operating portion driven by the hydraulic cylinder can be operated powerfully, and a part of operating parts of a hybrid-type construction machine can be driven with the same powerful feel as a hydraulic-only construction machine.

Other objects, features and advantages of the present invention will become more apparent from the following detailed description when read in conjunction with the accompanying drawings.

DETAILED DESCRIPTION OF THE PREFERRED EMBODIMENTS

A description will be given, with reference to the drawings, of embodiments of the present invention.

First, a description is given of a hybrid-type construction machine to which the present invention is applied.

Figure 1:
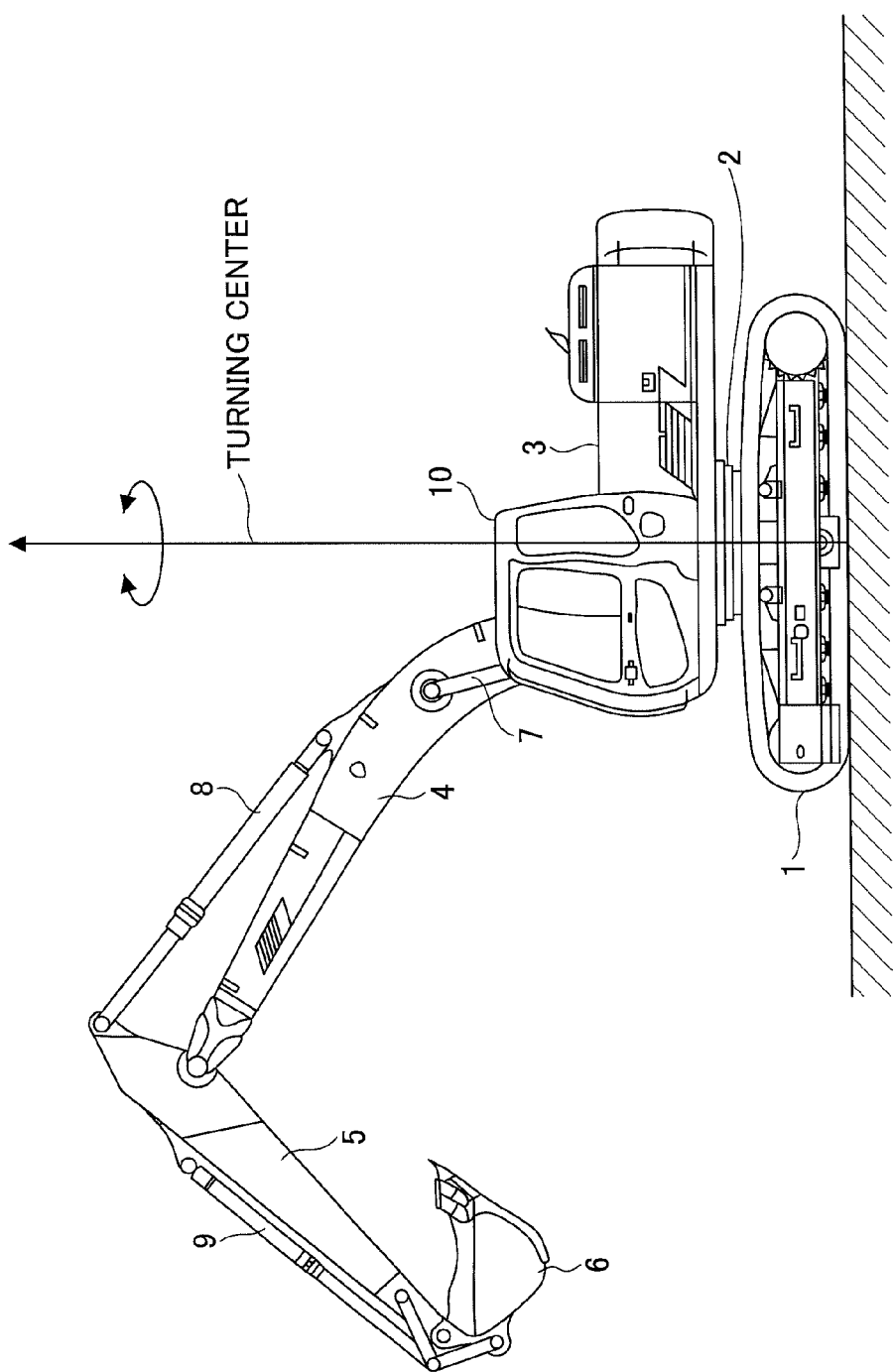
FIG. 1 is a side view of a hybrid-type shovel.

FIG. 1 is a side view of a hybrid-type shovel. An upper-part turning body 3 is mounted on a lower-part running body 1 via a turning mechanism 2. A boom 4 extends from the upper-part turning body 3, and an arm 5 is connected to an end of the boom 4. Further, a bucket 6 is connected to an end of the arm 5. The boom 4, the arm 5 and the bucket 6 are hydraulically driven by a boom cylinder 7, an arm cylinder 8 and a bucket cylinder 9, respectively. Moreover, a cabin 10 and a power source (not illustrated in the figure) are mounted on the upper-part turning body 3.

Figure 2:
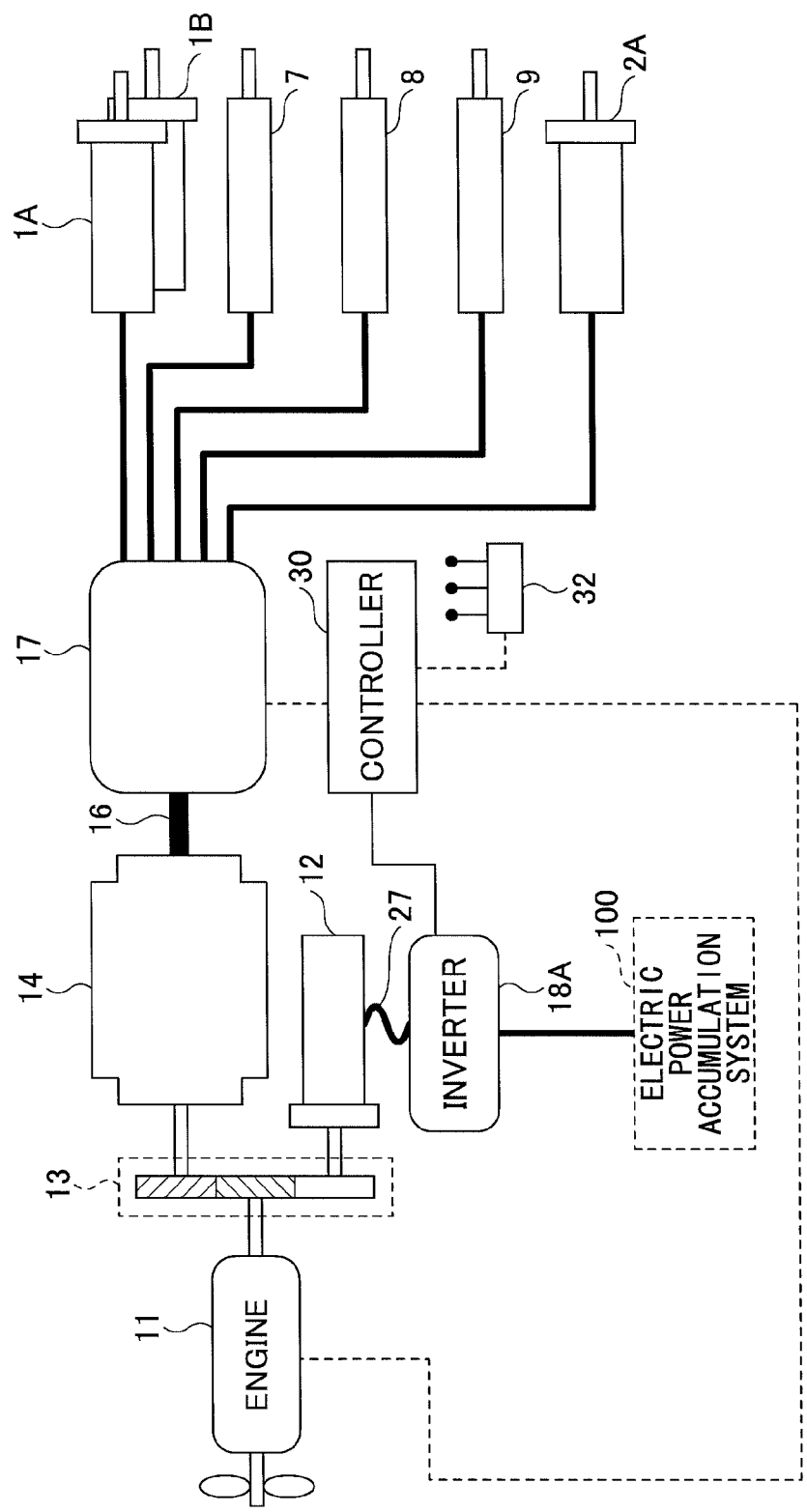
FIG. 2 is a block diagram illustrating a structure illustrating a drive system of the shovel illustrated in FIG. 1.

FIG. 2 is a block diagram illustrating a structure of the hybrid-type shovel illustrated in FIG. 1.

Both an engine 11 as a mechanical drive part and a motor generator 12 as an assist drive part (may be referred to as an assist motor 12) are connected to an input axis of a transmission machine 13 as a power increasing machine (also functions as a splitter). A variable-volume-type hydraulic pump 14 is connected to an output axis of the transmission machine 13. A control valve 17 is connected to the variable-volume-type hydraulic pump 14, which is a hydraulic pressure generator, through a high-pressure hydraulic line 16. Hereinafter, the variable-volume-type hydraulic pump 14 may be simply referred to as a hydraulic pump 14.

The control valve 17 is a control device which controls a hydraulic system. The control valve 17 is connected with hydraulic motors 1A (for right) and 1B (for left) for the lower-part running body 1, the boom cylinder 7, the arm cylinder 8, and the bucket cylinder 9 through high-pressure hydraulic lines.

Figure 3:
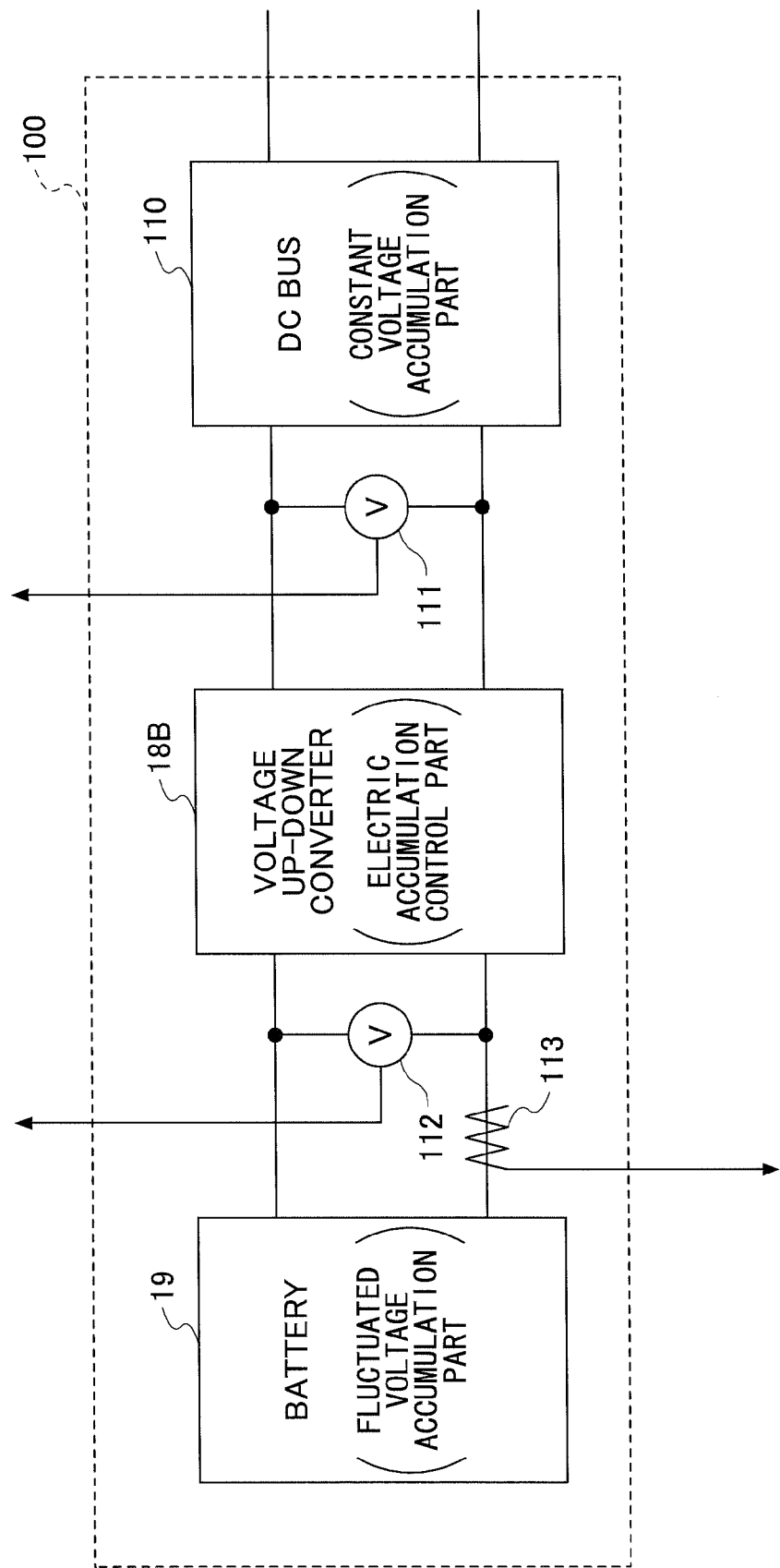
FIG. 3 is a block diagram of an electric power accumulation system.

An electric power accumulating system 100 is connected to the motor generator 12 via an inverter 18A. FIG. 3 is a block diagram of the electric power accumulation system 100. A battery 19 of the electric power accumulation system is connected to the motor generator 12 by a power line 27 so that the battery can be charged by an electric power from the motor generator 12 and the motor generator 12 can be driven by an electric power from the battery 19.

The electric power accumulation system 100 is constituted by a DC bus 110 as a constant voltage electric power accumulation part, a voltage up-down converter 18B as an electric power accumulation control part, and a battery 19 as a fluctuation voltage electric power accumulation part.

One side of the voltage up-down converter 18B is connected to the battery 19 through the DC bus 110, and the other side is connected to the battery 19 so as to perform a control to switch between voltage-up and voltage-down so that a DC bus voltage value falls within a fixed range. When the motor generator 12 performs a motor (assist) operation, it is necessary to raise the DC bus voltage value because it is necessary to charge a generated electric power to the battery through the inverter 18A. An operation state of the motor generator 12 is changed in response to a load condition of the engine 11.

The DC bus 110 is arranged between an inverter 18A and the voltage up-down converter 18B, and is configured be capable of exchange an electric power between the battery 19 and the motor generator 12.

A DC bus voltage detection part detects a DC bus voltage value. The detected DC bus voltage value is input to the controller 30, and is used to the switch control of a voltage-up operation and a voltage-down operation to cause the DC bus voltage value to fall within the fixed range.

A battery voltage detection part 112 is a voltage detection part for detecting a voltage value of the battery 19, and is used to detect a charged state of the battery. The detected battery voltage value is input to the controller 30, and is used to perform a switch control between a voltage-up operation and a voltage-down operation of the voltage up-down converter 100.

A battery current detection part 113 is a current detection part for detecting a current value of the battery 19. The battery current value is detected so that a current flowing from the battery 19 to the voltage up-down converter 100 is set as a positive value. The detected battery current value is input to the controller 30, and is used to perform the switch control between the voltage-up operation and the voltage-down operation of the voltage up-down converter 100.

The shovel having the above-mentioned structure is a hybrid-type construction machine using the engine 11 and the motor generator 12 as power sources. Those power sources are mounted on the upper-part turning body 3 illustrated in FIG. 1. A description will be given below of each part.

The engine 11 is, for example, an internal combustion engine, which is constituted by a diesel engine, and an output axis thereof is connected to one of input axes of the transmission machine 13. The engine 11 is always operated during operation of the shovel.

The motor generator 12 can be any electric motor which is capable of performing both a motor (assist) operation and a generating operation. Here, as the motor generator 12, a motor generator alternate-current-driven by the inverter 18A is indicated. The motor generator 12 can be constituted by, for example, an IPM (Interior Permanent Magnet) motor having a magnet embedded in an interior of a rotor. The rotation axis of the motor generator 12 is connected to the other of the input axes of the transmission machine 13.

The transmission machine 13 has two input axes and one output axis. A drive axis of the engine 11 and a drive axis of the motor generator 12 are connected to the two input axes, respectively. An output axis is connected with a drive axis of the hydraulic pump 14. When a load to the engine 11 is large, the motor generator 12 performs the motor (assist) operation so that a drive force of the motor generator 12 is transmitted to the hydraulic pump 14 via the output axis of the transmission machine 13. Thereby, a drive of the engine 11 is assisted. On the other hand, when a load to the engine 11 is small, the motor generator 12 performs a generation by a generating operation by a drive force of the engine 11 being transmitted to the motor generator via the transmission machine 13. Switching between the motor (assist) operation and the generating operation of the motor generator 12 is performed by the controller 30 in accordance with a load to the engine 11 and the like.

The hydraulic pump 14 is a hydraulic pump which generates a hydraulic pressure to be supplied to the control valve 17. The hydraulic pressure generated by the hydraulic pump 14 is supplied to drive each of the hydraulic motors 1A and 1B, the boom cylinder 7, the arm cylinder 8, the bucket cylinder 9, and the turning hydraulic motor 2A.

The control valve 17 is a hydraulic control device to perform a hydraulic drive control by controlling a hydraulic pressure supplied to each of the hydraulic motors 1A and 1B for lower-part running body 1, the boom cylinder 7, the arm cylinder 8, the bucket cylinder 9, and the turning hydraulic motor 2A connected through the high-pressure hydraulic lines according to an operation input of an operator.

The inverter 18A is provided between the motor generator 12 and the battery 19 as mentioned above in order to perform an operation control of the motor generator 12 based on a command from the controller 30. Thereby, when the inverter 18A controls the motor generator 12 to perform a motor (assist) operation, the inverter 18A supplies a necessary electric power to the motor generator 12 from the battery 19. On the other hand, when controlling a generating operation of the motor generator 12, the inverter 18A supplies electric power generated by the motor generator 12 to the battery 19. A charge and discharge control of the battery 19 is performed by the controller based on a charged state of the battery 19 and an operating state of the motor generator 12 (a motor (assist) operation or a generating operation).

The controller 30 is a control device to perform a drive control of the shovel, and is constituted by an operation processing device including a CPU (Central Processing Unit) and an internal memory. An engine speed control, a hydraulic motor output control, a battery charge and discharge control, etc., are realized by the CPU of the controller 30 performing a program for a drive control stored in the internal memory.

An input signal generated by an operator operating an operation part 32 provided in an operation room of the hybrid-type construction machine is supplied to the controller 30. The operation part 32 is provided with a boom operation lever for operating the boom 4, an arm operation lever for operating the arm 5, a bucket operation member for operating the bucket 6, a travel operation lever for operating travel, and a turning operation lever for operating turning. By an operator moving those operation levers, input signals in response to the operation amount of the operation levers are input to the controller 30.

Next, a description will be given of an output control of a hydraulic pump according to a first embodiment of the present invention. In the first embodiment, the above-mentioned variable-volume-type hydraulic pump 14 is used as a hydraulic pump for supplying a hydraulic pressure to a hydraulic load. The variable-volume-type hydraulic pump 14 is a hydraulic pump which can adjust a maximum output (horse power) by an input signal (current signal) from outside.

In the present embodiment, the maximum output of the variable-volume-type hydraulic pump 14 is larger than the maximum output of the engine 11. That is, a variable-volume-type hydraulic pump, which can provide an output larger than the maximum output of the engine 11, is used as the variable-volume-type hydraulic pump 14.

Figure 4:
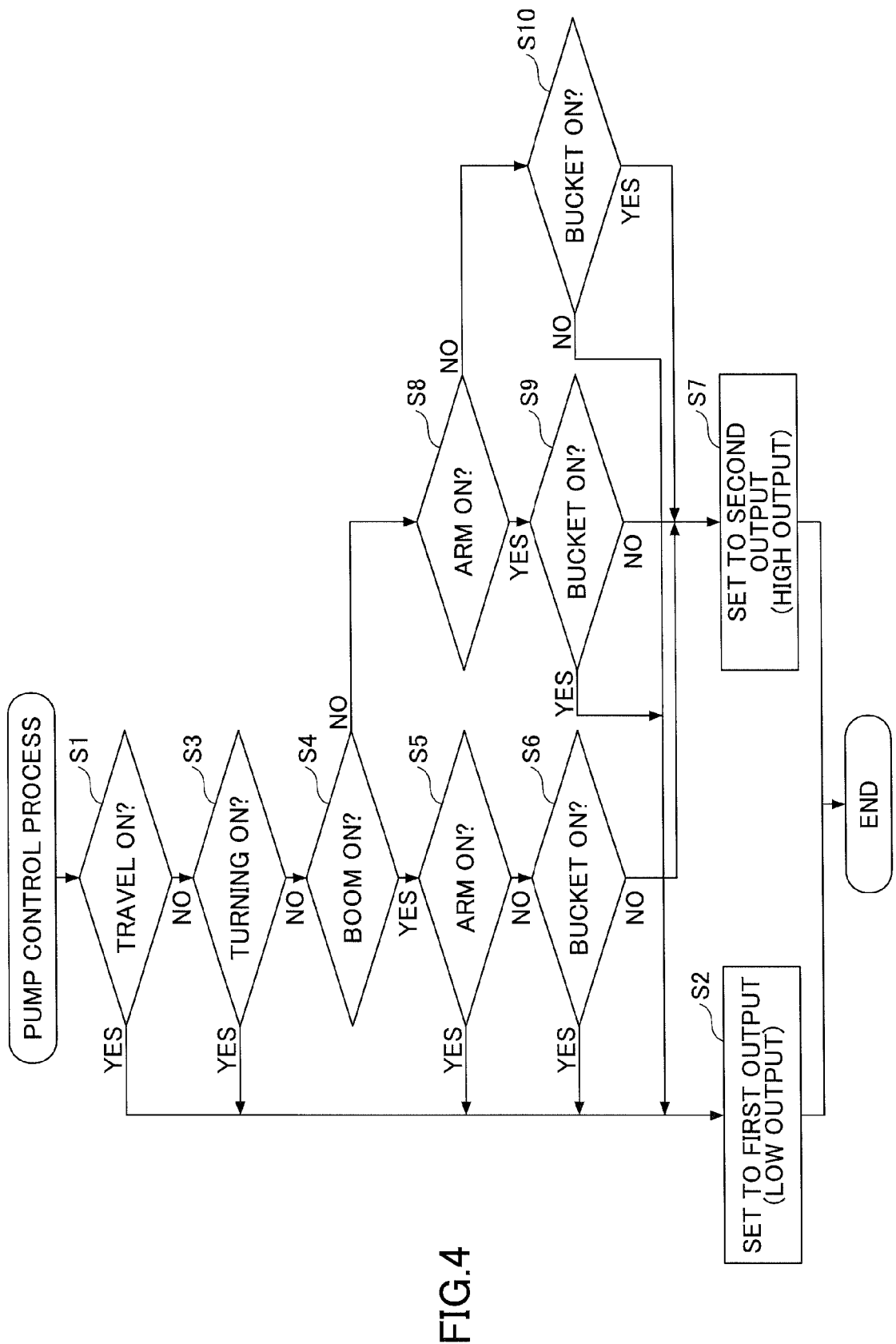
FIG. 4 is a flowchart of a hydraulic pump output control process according to a first embodiment of the present invention.
Figure 5:
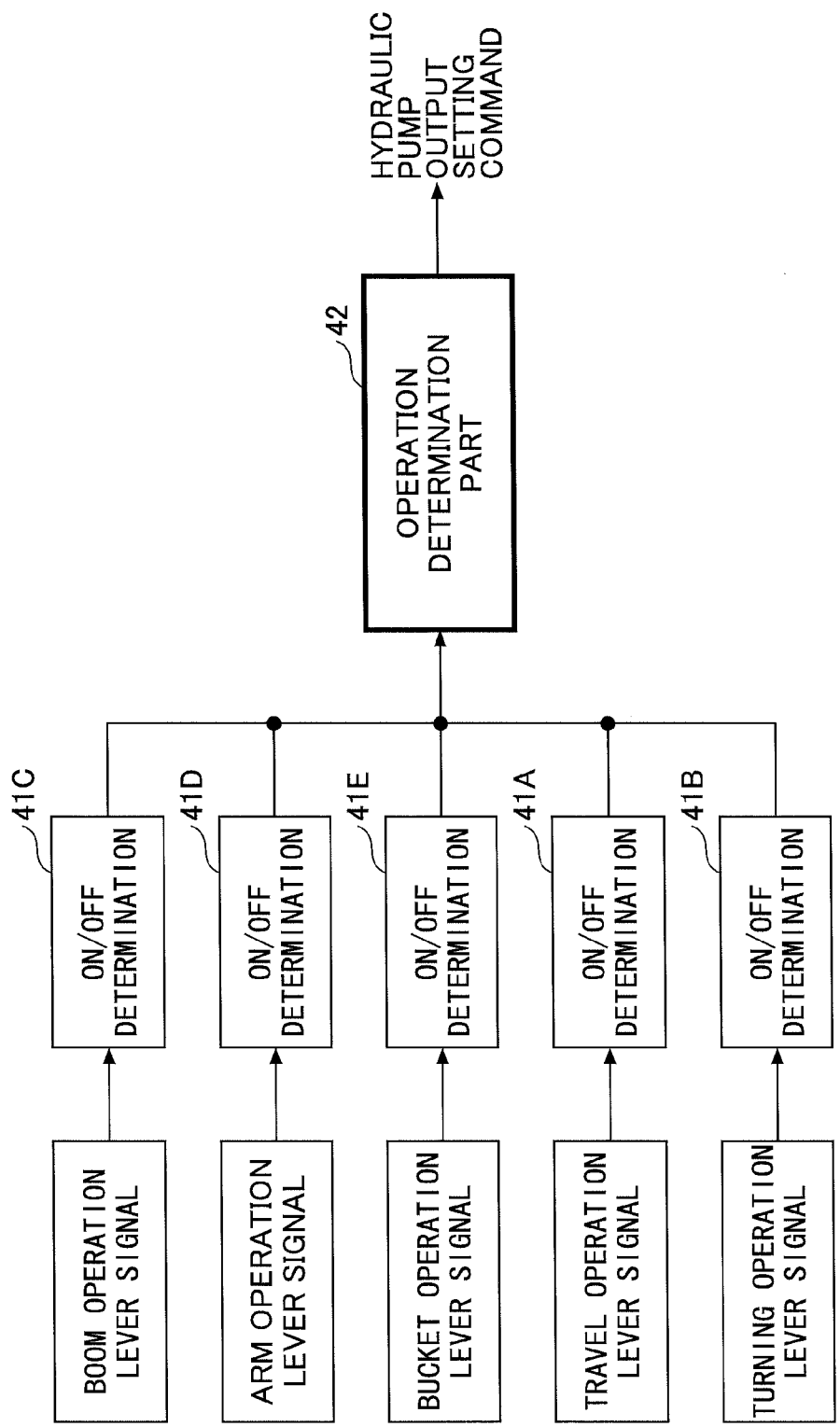
FIG. 5 is a functional block diagram of a portion performing an output control of a hydraulic pump in a controller.

FIG. 4 is a flowchart of the output control of a hydraulic pump. FIG. 5 is a functional block diagram of a portion which performs the output control of a hydraulic pump in the controller 30.

When the output control of the hydraulic pump is started, first, it is determined, in step S1, whether the shovel is traveling. This determination is performed by determining by an ON/OFF determination part 41A whether a travel operation lever signal is ON or OFF. The travel operation lever signal is an electric signal generated when the travel operation lever of the operation part 32 is operated. When the travel operation lever signal is ON, it represents that an operator is operating the travel operation lever and the shovel is traveling. A determination result of the ON/OFF determination part 41A is supplied to the operation determination part 42.

The operation determination part 42 is a functional part realized by the controller 30, and corresponds to a part performing the output control illustrated in FIG. 4. The operation determination part 42 outputs a hydraulic pump output setting instruction for setting an output of the hydraulic pump 14 based on a result of determination of an operation of the hydraulic load as mentioned later. According to the hydraulic pump output setting instruction, the output of the hydraulic pump is set to a first output (low output) or a second output (high output).

If it is determined in step S1 that the shovel is traveling (YES of step S1), the process proceeds to step S2. In step S2, a process of setting the maximum output of the hydraulic pump 14 to the first output (low output) if performed. The first output (low output) is an output equal to or smaller than the maximum output of the engine 11. The process of setting the maximum output of the variable-volume-type hydraulic pump 14 to the first output (low output) in step S2 is performed by inputting an output adjustment signal to the variable-volume-type hydraulic pump 14. The output adjustment signal is, for example, a current signal which can adjust/control the output of the hydraulic pump in accordance with a level of a current.

On the other hand, if it is determined in step S1 that the shovel is not traveling (NO of step S1), the process proceeds to step S3. In step S3, it is determined whether the upper-part turning body 3 of the shovel is turning. This determination is performed by determining by an ON/OFF determination part 41B whether a turning operation lever signal is ON or OFF as illustrated in FIG. 5. The turning operation lever signal is an electric signal generated when the turning operation lever of the operation part 32 is operated. If the turning operation lever signal is ON, this represents that the upper-part turning body 3 of the shovel is turning by an operator operating the turning operation lever. A determination result at the ON/OFF determination part 41B is supplied to the single operation determination part 42.

If it is determined in step S3 that the upper-part tuning body 3 is turning (YES of step S3), the process proceeds to step S2. In step S2, the process of setting the maximum output of the hydraulic pump 14 to the first output (low output) is performed as mentioned above.

On the other hand, if it is determined in step S3 that the upper-part tuning body 3 is not turning (NO of step S3), the process proceeds to step S4. In step S4, it is determined whether the boom 4 of the shovel is in operation. This determination is performed by determining by an ON/OFF determination part 41C whether a boom operation lever signal is ON or OFF as illustrated in FIG. 5. The boom operation lever signal is an electric signal generated when the boom operation lever of the operation part 32 is operated. If the boom operation lever signal is ON, this represents that the boom 4 is in operation by an operator operating the boom operation lever. A determination result at the ON/OFF determination part 41C is supplied to the single operation determination part 42.

If it is determined in step S4 that the boom 4 is in operation (YES of step S4), the process proceeds to step S5. In step S5, it is determined whether the arm 5 of the shovel is in operation. This determination is performed by determining by an ON/OFF determination part 41D whether an arm operation lever signal is ON or OFF as illustrated in FIG. 5. The arm operation lever signal is an electric signal generated when the arm operation lever of the operation part 32 is operated. If the arm operation lever signal is ON, this represents that the arm 5 is in operation by an operator operating the arm operation lever. A determination result at the ON/OFF determination part 41D is supplied to the single operation determination part 42.

If it is determined in step S5 that the arm 5 is in operation (YES of step S5), the process proceeds to step S2 in which the process of setting the maximum output of the hydraulic pump 14 to the first output (low output) is performed as mentioned above.

On the other hand, if it is determined in step S5 that the arm 5 is not in operation (NO of step S5), the process proceeds to step S6. In step S6, it is determined whether the bucket 6 of the shovel is in operation. This determination is performed by determining by an ON/OFF determination part 41E whether a bucket operation lever signal is ON or OFF as illustrated in FIG. 5. The bucket operation lever signal is an electric signal generated when the bucket operation lever of the operation part 32 is operated. If the bucket operation lever signal is ON, this represents that the bucket 6 is in operation by an operator operating the bucket operation lever. A determination result at the ON/OFF determination part 41E is supplied to the single operation determination part 42.

If it is determined in step S6 that the bucket 6 is in operation (YES of step S6), the process proceeds to step S2 in which the process of setting the maximum output of the hydraulic pump 14 to the first output (low output) is performed as mentioned above.

On the other hand, if it is determined in step S6 that the bucket 6 is not in operation (NO of step S6), the process proceeds to step S7. In step S7, the process of setting the maximum output of the hydraulic pump 14 to the second output (high output). The second output (high output) is an output larger than the maximum output of the engine 11. The process of setting the maximum output of the variable-volume-type hydraulic pump 14 to the second output (high output) is performed by inputting the above-mentioned output adjustment signal to the variable-volume-type hydraulic pump 14.

If the output adjustment signal is a current signal, the current value when setting the first output (low output) is set in step S2, and the current value when setting the second output (high output) is set in step S7.

If it is determined in step S4 that the boom 4 is not in operation (NO of step S4), the process proceeds to step S8. In step S8, it is determined, similar to the step S5, whether the arm 5 of the shovel is in operation. This determination is performed by determining by the ON/OFF determination part 41D whether the arm operation lever signal is ON or OFF as illustrated in FIG. 5.

If it is determined in step S8 that the arm 5 is in operation (YES of step S8), the process proceeds to step S9. In step S9, it is determined, similar to the step S6, whether the bucket 6 of the shovel is in operation. This determination is performed by determining by the ON/OFF determination part 41E whether the bucket operation lever signal is ON or OFF as illustrated in FIG. 5.

If it is determined in step S9 that the bucket 6 is in operation (YES of step S9), the process proceeds to step S2 in which the process of setting the maximum output of the hydraulic pump 14 to the first output (low output) is performed.

On the other hand, if it is determined in step S9 that the arm 5 is not in operation (NO of step S9), the process proceeds to step S7 in which the process of setting the maximum output of the hydraulic pump 14 to the second output (high output) is performed.

On the other hand, if it is determined in step S8 that the arm 5 is not in operation (NO of step S8), the process proceeds to step S10. In step S10, it is determined, similar to the steps S6 and S9, whether the bucket 6 of the shovel is in operation. This determination is performed by determining by the ON/OFF determination part 41E whether the bucket operation lever signal is ON or OFF as illustrated in FIG. 5.

If it is determined in step S10 that the bucket 6 is in operation (YES of step S10), the process proceeds to step S7 in which the process of setting the maximum output of the hydraulic pump 14 to the second output (high output) is performed as mentioned above.

On the other hand, if it is determined in step S10 that the bucket 6 is not in operation (NO of step S10), the process proceeds to step S2 in which the process of setting the maximum output of the hydraulic pump 14 to the first output (low output) is performed as mentioned above.

After the maximum output of the hydraulic pump 14 is set to the first output (low output) or the second output (high output) in step S2 or step S7, the output control process of the pump is ended.

According to the above-mentioned output control of the hydraulic pump, if the shovel is traveling or the upper-part turning body 3 is turning (YES of step S1 and YES of step S2), the output of the hydraulic pump 14 is set to the first output (low output). Because the first output is an output equal to or smaller than the maximum output of the engine 11, it is possible to drive the hydraulic pump 14 only by the output of the engine 11. That is, the travel of the shovel or the turning of the upper-part turning body 3 can be performed by the output of the engine 11.

The travel of the shovel is performed by supplying a hydraulic pressure to the hydraulic motors 1A and 1B for running, and, in many cases, a hydraulic pressure is supplied to the hydraulic motors 1A and 1B continuously for a certain long period of time. Moreover, the turning of the upper-part turning body 3 is performed by supplying a hydraulic pressure to the turning hydraulic motor 2A, and, in many cases, a hydraulic pressure is supplied to the turning hydraulic motor 2A continuously for a certain long period of time. That is, because hydraulic pressure is supplied to hydraulic motors continuously for a certain long period of time in many cases, the hydraulic pump 14 is driven only by the output of the engine 11, which can be supplied continuously.

If the shovel is not traveling or the upper-part turning body 3 is not turning (NO of step S1 and NO of step S2), it is determined whether the boom 4, the arm 5 and the bucket 6 are in operation (the process of steps S4, S5, S6, S8, S9 and S10). This process is a process of setting the output of the hydraulic pump 14 to the second output (high output) only when one of the boom 4, the arm 5 and the bucket 6 is in operation.

For example, if it is determined in step S4 that the boom 4 is in operation, the output of the hydraulic pump 14 is set to the second output (high output) only when it is determined in step S5 that the arm 5 is not in operation and it is determined in step S6 that the bucket 6 is not in operation (that is, only the boom 4 is in operation). Moreover, for example, even if it is determined in step S4 that the boom 4 is not in operation, the output of the hydraulic pump 14 is set to the second output (high output) only when it is determined in step S8 that the arm 5 is in operation and it is determined in step S9 that the bucket 6 is not in operation (that is, only the arm 5 is in operation). Further, for example, if it is determined in step S4 that the boom 4 is not in operation, the output of the hydraulic pump 14 is set to the second output (high output) only when it is determined in step S8 that the arm 5 is not in operation and it is determined in step S10 that the bucket 6 is in operation (that is, only the bucket 6 is in operation).

As appreciated from the above-mentioned process, when only one of the boom 4, the arm 5 and the bucket 6 is in operation, the output of the hydraulic pump 14 is set to the second output (high output). Accordingly, because a hydraulic output supplied to the hydraulic cylinders 7, 8 and 9 can be set larger than usual, an operation can be powerfully performed by the boom 4, the aim 5 and the bucket 6. The hydraulic cylinders perform operations within a limited stroke, and it is rare to supply a hydraulic pressure continuously for a long time. Accordingly, a time during which the output of the hydraulic pump 14 is set to the second output (high output) is short, and there is no case where it is set to the second output (high output) continuously for a long time.

Here, when the hydraulic pump 14 is set to the second output (high output), the output of the motor generator (assist motor) 12 according to a motor (assist) operation is added to the output of the engine 11 because the second output (high output) is larger than the maximum output of the engine 11. That is, when the hydraulic pump is set to the second output (high output), the motor generator (assist motor) 12 is caused to perform a power running operation by an electric power from the battery, which sets a state where the battery 19 is discharging. If the setting to the second output (high output) lasts continuously for a long time, an amount of discharge of the battery 19 becomes large, which may cause a state of charge to be extremely small.

Thus, according to the present embodiment, a powerful operation can be performed while an extreme reduction of a state of charge of the battery 19 is prevented by setting the output of the hydraulic pump 14 to the second output (high output) only when only one of the hydraulic cylinders of which operation time is short is in operation as mentioned above.

Figure 6:
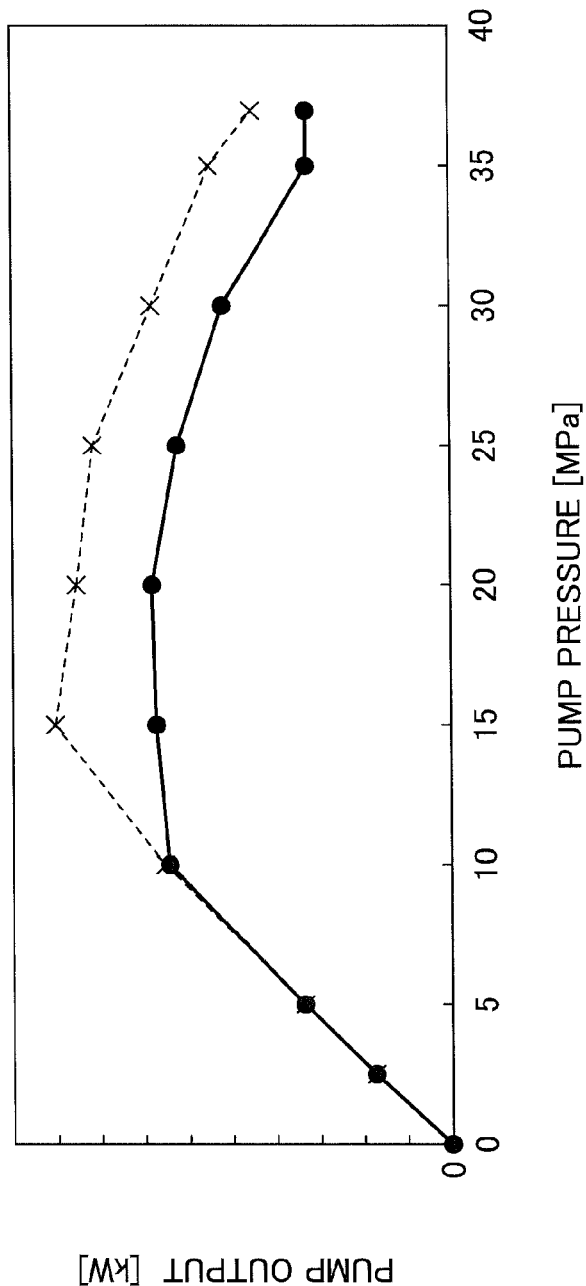
FIG. 6 is a graph indicating an output characteristic of the hydraulic pump.

FIG. 6 is a graph indicating an output characteristic of the hydraulic pump 14. In FIG. 6, a pump output in a case where it is set to the first output (low output) is indicated by a solid line, and a pump output in a case where it is set to the second output (high output) is indicated by a dotted line. If the first output (low output) is set equal to the maximum output of the engine 11, a difference between the pump output (second output) indicated by the dotted line and the pump output (first output) indicated by the solid line is made up by an output by a motor (assist) operation of the motor generator (assist motor) 12.

According to the above-mentioned structure, an output of the hydraulic pump 14 can be set larger than an output of the engine for a short period of time while setting the maximum output of the engine 11 small, thereby enabling a powerful operation by supplying a large hydraulic pressure to a hydraulic load (hydraulic cylinder). Additionally, because assist of the motor generator (assist motor) 12 is in a short period of time, there is no possibility of reducing a state of charge of the battery 19.

Figure 7:
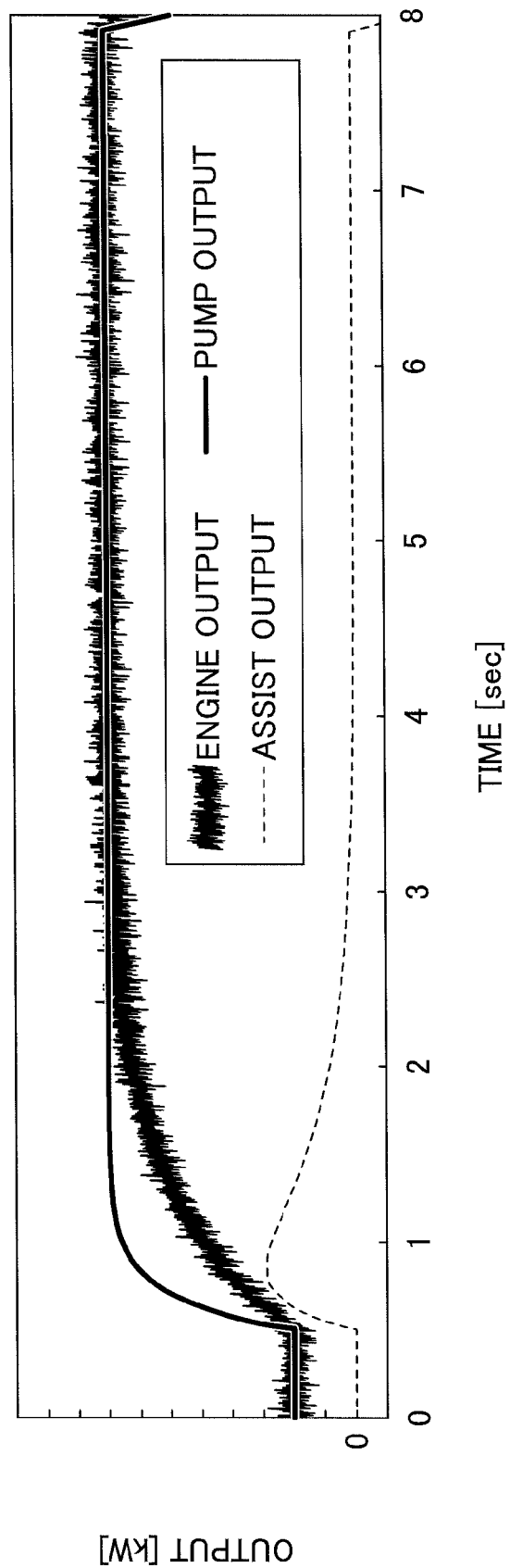
FIG. 7 is a graph indicating outputs of an engine, an assist motor and the hydraulic pump when an output of the hydraulic pump is set to a first output (low output) equal to an output of the engine.

FIG. 7 is a graph indicating outputs of the engine 11, the assist motor 12 and the hydraulic pump 14 when the output of the hydraulic pump 14 is set to the first output (low output) equal to the output of the engine 11. The example illustrated in FIG. 7 is in a state where the shovel is traveling by the hydraulic motors 1A and 1B being supplied with a hydraulic pressure from the hydraulic pump 14. The output of the engine 11 reaches at maximum at about 2.5 seconds after start traveling. Until the output of the engine 11 reaches at maximum, the assist motor 12 is caused to perform a power-running operation. Thereby, the output of the hydraulic pump 14 is a sum of the output of the engine 11 and the output of the assist motor 12, and the travel can be started by rapidly supplying a hydraulic pressure to the hydraulic motors 1A and 1B. After abut 2.5 seconds have passed from the start of the travel, the output of the engine 11 becomes at the maximum output, which is equal to the output of the hydraulic pump 14. Accordingly, the output of the assist motor 12 is unnecessary, and, thereafter, the hydraulic pump 14 is driven only by the output of the engine 11.

Figure 8:
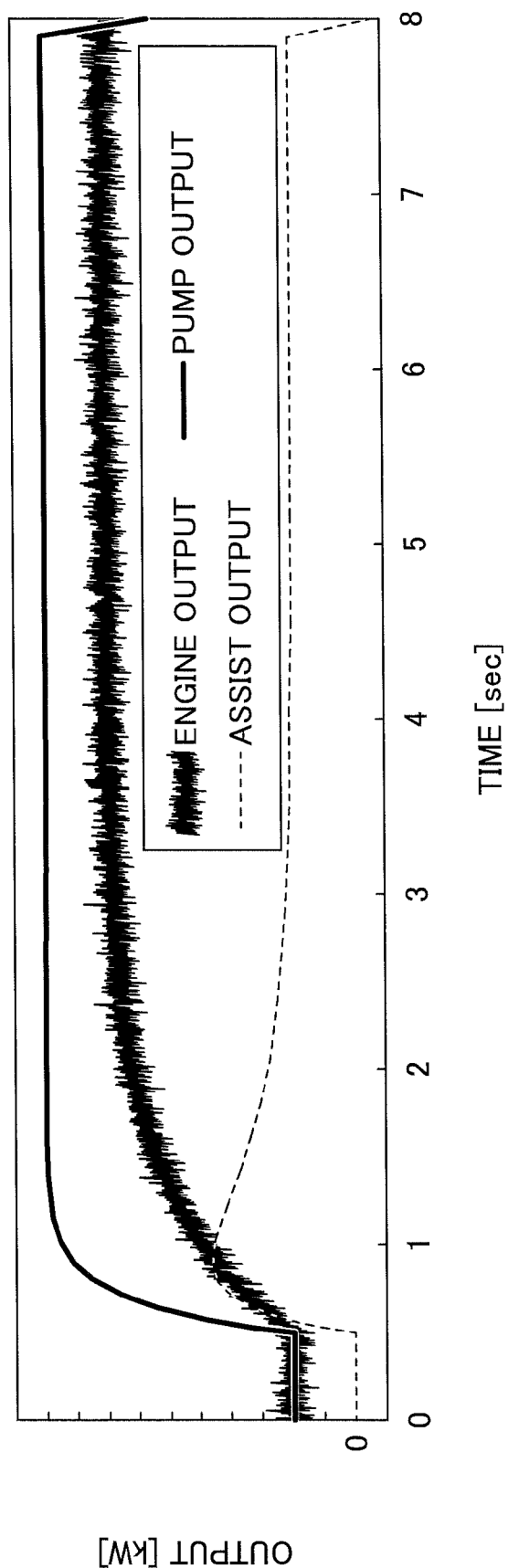
FIG. 8 is a graph indicating outputs of the engine, the assist motor and the hydraulic pump when an output of the hydraulic pump is set to a second output (high output) larger than an output of the engine.

FIG. 8 is a graph indicating outputs of the engine 11, the assist motor 12 and the hydraulic pump 14 when the output of the hydraulic pump 14 is set to the second output (high output) higher than the output of the engine 11. The example illustrated in FIG. 8 is in a state where only the bucket 6 is operated by supplying a hydraulic pressure to the bucket cylinder 9, which is a hydraulic cylinder for bucket. The output of the engine 11 reaches at maximum at about 2.5 seconds after starting an operation of the bucket 6. Until the output of the engine 11 reaches at maximum, the assist motor 12 is caused to perform a power-running operation. Thereby, the output of the hydraulic pump 14 is a sum of the output of the engine 11 and the output of the assist motor 12, and the operation can be started by rapidly supplying a hydraulic pressure to the bucket cylinder 9. After about 2.5 seconds have passed from the start of the operation by the bucket 6, the output of the engine 11 becomes at the maximum output. Here, because only the bucket 6 is operated, the output of the hydraulic pump is set to the second output (high output) larger than the maximum output of the engine 11. Accordingly, the assist motor 12 is caused to continuously perform the power-running operation even after the output of the engine 11 becomes at the maximum output. Thereby, a sum of the output of the engine 11 and the output of the assist motor 12 is supplied to the hydraulic pump 14, which becomes the output of the hydraulic pump 14. Accordingly, a hydraulic output larger than a normal hydraulic output of the hydraulic pump 14 is supplied to the bucket cylinder 9, which permits a powerful operation by the bucket 6.

As mentioned above, the hybrid-type shovel according to the present embodiment includes the engine 11, which drives the variable-volume-type hydraulic pump 14, a plurality of hydraulic actuators driven by a hydraulic pressure supplied from the variable-volume-type hydraulic pump 14, and the assist motor, which is driven by an electric power from the battery 19 to assist the engine 11. Then, the maximum output of the variable-volume-type hydraulic pump 14 is equal to or larger than the maximum output of the engine 11, and the assist motor 12 assists the engine 11 when operating while the output of the variable-volume-type hydraulic pump 14 is set larger than the maximum output of the engine 11. Thereby, when the hydraulic actuator to be driven is only a hydraulic cylinder, the output of the variable-volume-type hydraulic pump 14 is increased temporarily to perform a hydraulic operation with a large output. Thus, the operating part of the hybrid-type shovel driven by the hydraulic cylinder can be operated powerfully, and a part of the operating parts of the hybrid-type shovel can be driven with a powerful feel the same as a conventional hydraulic shovel.

In addition, although the output of the hydraulic pump 14 is set high to perform a powerful operation when operating only one hydraulic cylinder in the above-mentioned embodiment, if a state of charge of the battery 19 can be maintained, the output of the hydraulic pump 14 is set high to perform a powerful operation when operating a plurality of hydraulic cylinders. That is, when driving a hydraulic motor from among the hydraulic actuators as a hydraulic load, the output of the hydraulic pump 14 is maintained at the first output (low output), and when driving only a hydraulic cylinder, the output of the hydraulic pump 14 is set to the second output (high output). Such a control can be achieved easily based on the output control illustrated in FIG. 4.

Moreover, when the hydraulic actuators are not driven, that is, when a hydraulic output from the hydraulic pump 14 is not necessary, the output of the hydraulic pump may be set to a value smaller than the maximum output of the engine 11. Because the variable-volume-type hydraulic pump is used as the hydraulic pump 14 in the present embodiment, the output of the hydraulic pump 14 can be set arbitrarily.

Figure 9:
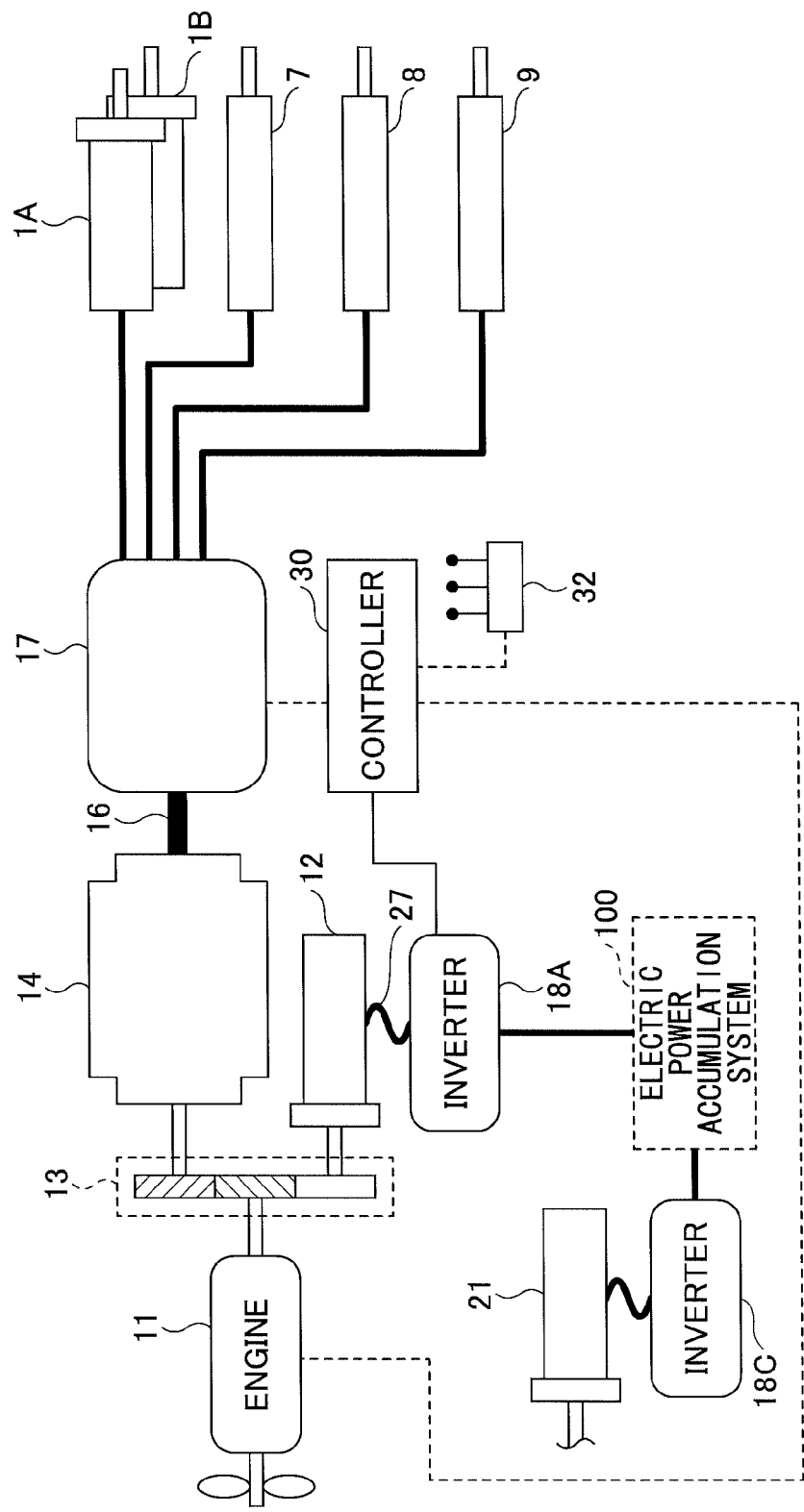
FIG. 9 is a block diagram illustrating a structure of a drive system of a shovel when an upper turning body is turned by a turning electric motor.

Moreover, although the upper-part turning body 3 is turned by driving the hydraulic motor 2A as illustrated in FIG. 2 in the above-mentioned shovel, it may be configured to turn the upper-part turning body 3 by driving an electric motor. In this case, as illustrated in FIG. 9, a turning electric motor 21 as the electric motor is provided instead of the hydraulic motor 2A for driving the upper-part turning body 3. The turning electric motor 21 is connected to the electric power accumulation system 100 via an inverter 18C. An electric power is supplied from the electric power accumulation system 100 to the turning electric motor 21 via the inverter 18C, and the turning mechanism 2 is driven by the turning electric motor 21 to turn the upper-part turning body 3. When the turning electric motor 21 reduces a speed, the turning electric motor 21 is caused to perform a regenerating operation, and an electric power generated may be accumulated in the electric power accumulation system 100 via the inverter.

When driving the upper-part turning body 3 by the turning electric motor 21 as illustrated in FIG. 9, there is no need to determine in step S3 whether the upper-part turning body 3 of the shovel is turning in the output control process of the hydraulic pump illustrated in FIG. 4, and step S3 is omitted. Accordingly, the ON/OFF determination part 41B, which performs a determination of ON/OFF of the turning operation lever in FIG. 5.

In the above-mentioned first embodiment, in the output control process of the hydraulic pump illustrated in FIG. 4, the output of the hydraulic pump is set to the second output (high output) only when the operation of only one of the boom, arm and bucket is set to ON. That is, the output of the variable-volume-type hydraulic pump 14 is set to a high output only when a hydraulic pressure is supplied to only one of the boom cylinder 7, the aim cylinder 8 and the bucket cylinder 9 from among a plurality of hydraulic actuators. This is based on the consideration that a supply of a hydraulic pressure to a hydraulic cylinder does not last continuously for a long time, and because the hydraulic pump 14 can be set to a high output temporarily for a short period of time if it is to drive only a single hydraulic cylinder, the power of the engine 11 and the output of the motor generator 12 (electric power from the battery) are sufficient to drive the single hydraulic cylinder.

Here, as a condition to permit the hydraulic pump 14 to be set to a high output temporarily for a short period of time, such a condition may be satisfied even when driving not a single hydraulic cylinder but a plurality of hydraulic cylinders. According to a second embodiment mentioned below, the hydraulic pump 14 is set to a high output temporarily for a short period of time even when a plurality of hydraulic cylinders are driven.

First, a description will be given of driving hydraulic actuators including hydraulic cylinders based on a basic work operation of a hydraulic shovel. As a typical operation to be performed using a hydraulic shovel, there is an excavation and loading operation. The excavation and loading operation is a series of operations including an excavating operation and a loading operation, and is a work to excavate and scoop an earth and dump the earth in a predetermined place such as a loading platform of a dump truck. The excavation and loading operation is specified in detail in Japan Construction Machinery and Construction Association Standard (JCMAS).

Figure 10:
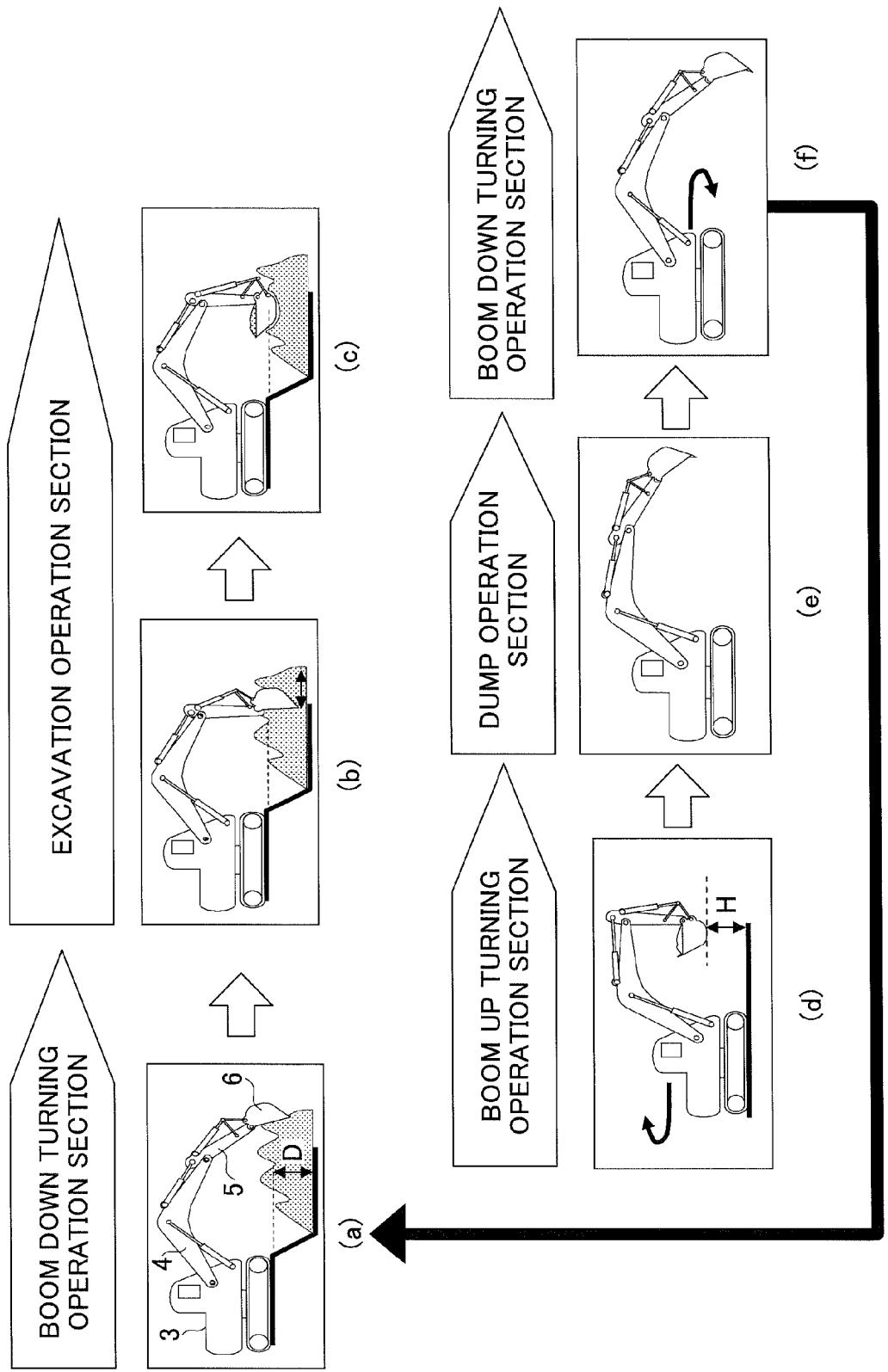
FIG. 10 is an illustration for explaining excavation and loading operation performed by the shovel.

A description will be given, with reference to FIG. 10, of the excavation and loading operation. First, as illustrated in FIG. 10-(a), in a state where the upper-part turning body 3 is turned and the bucket 6 is positioned above an excavation position and in a state where the arm 5 is opened and the bucket 6 is also opened, the operator moves down the boom 4 and moves down the bucket 6 so that a tip of the bucket 6 is at a target excavation depth D. Usually, the turning and boom down is operated by an operator, and the operator visually checks the position of the bucket 6. Additionally, it is usual to perform the turning of the upper-part turning body 3 and the moving down of the boom 4 simultaneously. The above-mentioned operation is referred to as a boom down turning operation, and this operation section is referred to as a boom down turning operation section.

When the operator judges that the tip of the bucket 6 reaches the target excavation depth D, then, it proceeds to a horizontal drawing operation as illustrated in FIG. 10-(b). In the horizontal drawing operation, the arm 5 is closed until the arm 5 is positioned perpendicular to the ground so that the tip of the bucket 6 moves horizontally. According to the horizontal drawing operation, the earth of a predetermined depth is excavated and scraped by the bucket 6. After the horizontal drawing operation is completed, then, the bucket 6 is closed until the bucket 60 makes 90 degrees with respect to the arm 5 as illustrated in FIG. 10-(c). That is, the bucket 6 is closed until an upper edge of the bucket 6 becomes horizontal to accommodate the scraped earth in the bucket 6. The abovementioned operation is referred to as an excavating operation, and the operation section is referred to as an excavating operation section.

When the operator judges that the bucket 6 is closed until it makes 90 degrees, then, the operator moves up the boom 4 until the bottom part of the bucket 6 is moved to a predetermined height H as illustrated in FIG. 10-(d). Subsequently or simultaneously, the upper-part turning body 3 is turned so as to turn the bucket 6 to a position of dumping earth. The above-mentioned operation is referred to a boom up turning operation, and the operation section is referred to as a boom up turning operation section.

When the operator judges that the boom up turning operation is completed, then, the operator dumps the earth in the bucket 6 by opening the arm 5 and the bucket 6 as illustrated in FIG. 10-(e). This operation is referred to as a dump operation, and the operation section is referred to as a dump operation section. In the dump operation, the earth dumping may be performed by opening only the bucket 6.

When the operator judges that the dump operation is completed, then, the operator causes the upper-part turning body 3 to turn in order to move the bucket 6 to a position directly above the excavation position as illustrated in FIG. 10-(f). At this time, the bucket 6 is moved down to an excavation start position by moving down the boom simultaneously with turning. This operation is a part of the boom down turning operation explained with reference to FIG. 10-(a). The operator causes the bucket 6 to move down from the excavation start position to the target excavation depth D as illustrated in FIG. 10-(a) and performs the excavating operation illustrated in FIG. 10-(b).

The above-mentioned "boom down turning operation", the "excavation operation", the "boom up turning operation", the "dump operation" and the "boom down turning operation" are made into one cycle, and the excavation and loading is progressed by repeating the cycle.

In the above-mentioned excavation and loading operation, for example, in the excavation operation section illustrated in FIG. 10-(b) and (c), a combined operation is performed such as closing the arm 5 while moving up the boom 4. Accordingly, in the excavation operation section, a hydraulic pressure is simultaneously supplied from the hydraulic pump 14 to a plurality of hydraulic cylinders (the boom cylinder 7 and the arm cylinder 8). Because it is not a drive of a single hydraulic cylinder in this case, the output of the hydraulic pump 14 is set to a low output in the above-mentioned first embodiment and an excavation power may be decreased.

However, even in the above-mentioned combined operation, in a case where a hydraulic actuator having a stroke limit such as the boom cylinder and the arm cylinder 8, because the drive time is a short time, a state of charge of the battery 19 does not extremely decrease even if the drive of the hydraulic pump 14 is assisted by the output of the motor generator 12. Therefore, according to the second embodiment, if a drive time is a short period of time and hydraulic actuators to be driven are hydraulic cylinders having a stroke limit, the output of the hydraulic pump 14 is set to the second output (high output) even in a combined operation in which the plurality of hydraulic actuators are driven simultaneously. Moreover, because a high output is required especially in the excavation operation section in many cases, it is desirable to set the output of the hydraulic pump 14 to the second output (high output) when a combined operation of the boom 4 and the arm 5 is performed in the excavation operation section.

Figure 11:
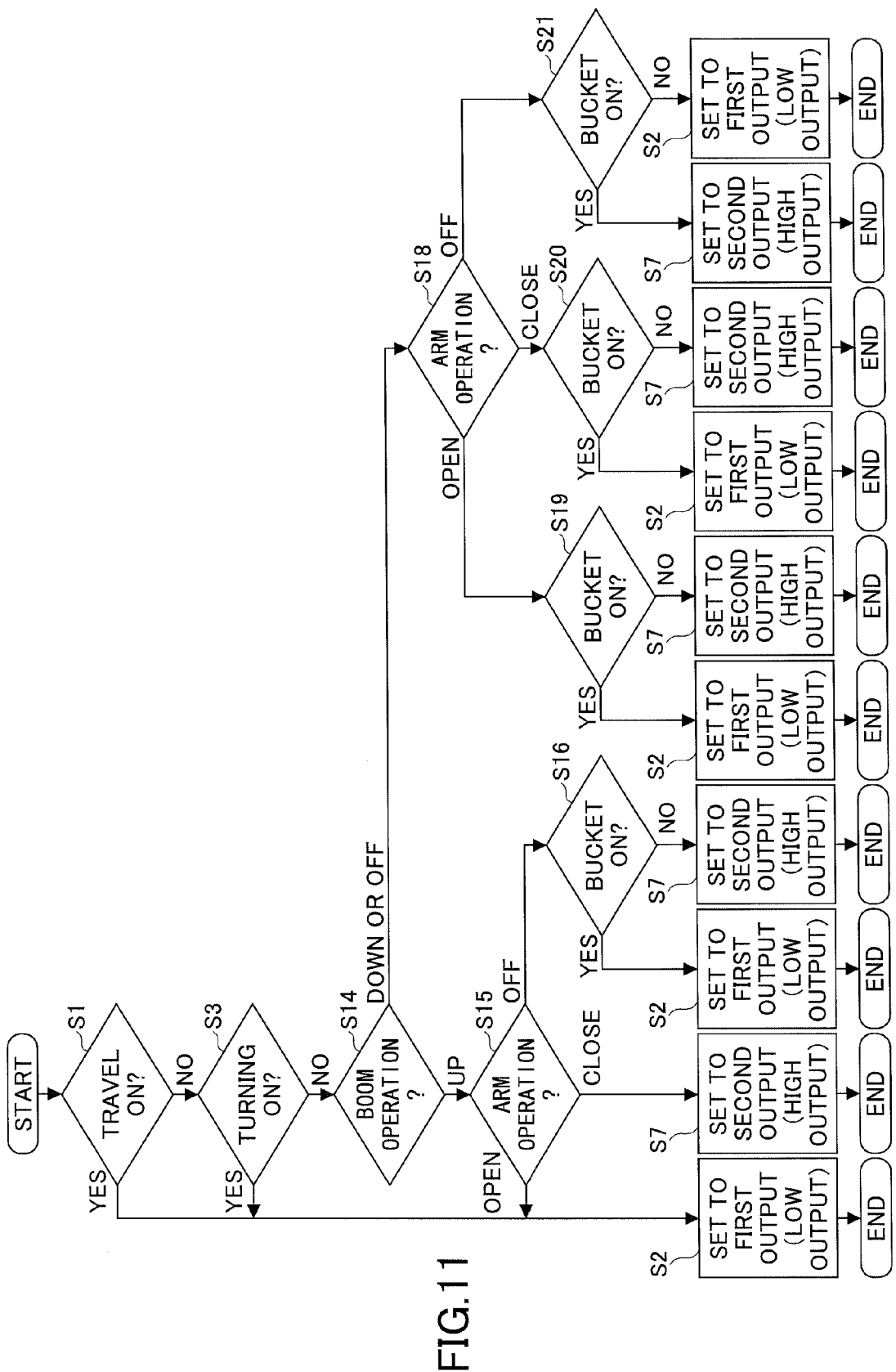
FIG. 11 is a flowchart of a hydraulic pump output control process according to a second embodiment of the present invention.

FIG. 11 is a flowchart of a hydraulic pump output control process according to the second embodiment. The process of steps S1-S3 is the same as the process of steps S1-S3 illustrated in FIG. 4, and the same step number is given and descriptions thereof are omitted.

If it is judged in step S3 that the upper-part turning body 3 is turning (YES of step S3), the process proceeds to step S2. In step S2, the process of setting the maximum output of the hydraulic pump 14 to the first output (low output) as mentioned above is performed.

On the other hand, if it is determined in step S3 that the upper-part turning body 3 is not turning (NO of step S3), the process proceeds to step S14. In step S14, it is determined whether the boom 4 of the shovel is in a boom up operation or in a boom down operation or not in operation. This determination is performed by determining by the ON/OFF determination part 41C whether the boom operation lever signal is ON or OFF as illustrated in FIG. 5. The boom operation lever signal is an electric signal generated when the boom operation lever of the operation part 32 is operated, and if the boom operation lever signal is ON, this represents that the operator operates the boom operation lever and the boom 4 is in operation. Additionally, in the present embodiment, if it is determined in step S14 that the boom 4 is in operation, it is determined whether the operation of the boom 4 is boom opening or boom closing.

This determination is also performed based on the boom operation lever signal. For example, it can be determined whether the boom is in operation based on the boom operation lever signal and is also determined, if the boom 4 is in operation, whether a direction of the operation corresponds to boom closing or boom opening, by setting a condition such that the boom operation lever signal is zero when the boom operation lever is not operated (when the boom operation lever is at a neutral position), the boom operation lever signal is a positive (plus) value when the boom operation lever is inclined toward a near side, and the boom operation signal is a negative (minus) value when the boom operation lever is inclined toward a far side.

If it is determined in step S14 that the boom 4 is in a boom up operation (UP of step S14), the process proceeds to step S15. In step S15, it is determined whether the arm 5 of the shovel is in an arm up operation or in an arm down operation or not in operation. This determination is performed by determining by the ON/OFF determination part 41D whether the arm operation lever signal is ON or OFF as illustrated in FIG. 5. The arm operation lever signal is an electric signal generated when the aim operation lever of the operation part 32 is operated, and if the arm operation lever signal is ON, this represents that the operator operates the arm operation lever and the arm 5 is in operation. Additionally, in the present embodiment, if it is determined in step S15 that the aim 5 is in operation, it is determined whether the operation of the arm 5 is arm opening or arm closing.

This determination is also performed based on the arm operation lever signal. For example, it can be determined whether the arm is in operation based on the arm operation lever signal and is also determined, if the arm 5 is in operation, whether a direction of the operation corresponds to arm closing or arm opening, by setting a condition such that the arm operation lever signal is zero when the arm operation lever is not operated (when the arm operation lever is at a neutral position), the arm operation lever signal is a positive (plus) value when the arm operation lever is inclined toward a near side, and the arm operation signal is a negative (minus) value when the arm operation lever is inclined toward a far side.

If it is determined in step S15 that the arm 5 of the shovel is in an arm opening operation (OPEN of S15), the process proceeds to step S2 in which the output of the hydraulic pump 14 is set to the first output (low output). If it is determined in step S15 that the arm 5 of the shovel is in an arm closing operation (CLOSE of S15), the process proceeds to step S7 in which the output of the hydraulic pump 14 is set to the second output (high output). On the other hand, if it is determined in step S15 that the arm 5 of the shovel is not in operation, the process proceeds to step S16.

In step S16, it is determined whether the bucket 6 of the shovel is in operation. This determination is performed by determining by the ON/OFF determination part 41E whether the bucket operation lever signal is ON or OFF as illustrated in FIG. 5. The bucket operation lever signal is an electric signal generated when the bucket operation lever of the operation part 32 is operated, and if the bucket operation lever signal is ON, this represents that the operator operates the bucket operation lever and the bucket 6 is in operation. A determination result by the ON/OFF determination part 41E is supplied to the single operation determination part 42.

If it is determined in step S16 that the bucket 6 is in operation (YES of step S16), the process proceeds to step S2 in which a process of setting the maximum output of the hydraulic pump 14 to the first output (low output) is performed.

On the other hand, if it is determined in step S16 that the bucket 6 is not in operation (NO of step S16), the process proceeds to step S7. In step S7, a process of setting the maximum output of the hydraulic pump 14 to the second output (high output) is performed. The second output (high output) is an output larger than the maximum output of the engine 11. The process of setting the maximum output of the hydraulic pump 14 to the second output (high output) is performed by inputting the above-mentioned output adjustment signal to the variable-volume hydraulic pump 14.

If the output adjustment signal is a current signal, a current value when setting to the first output (low output) is set in step S2, and a current value when setting to the second output (high output) is set in step S7.

On the other hand, if it is determined in step S14 that the boom 4 is in the boom down operation or not in operation (DOWN or OFF of step S14), the process proceeds to step S18. Similar to step S15, it is determined in step S18 whether the aim 5 of the shovel is in an arm up operation or an arm down operation or not in operation.

If it is determined in step S18 that the arm 5 of the shovel is in an arm opening operation (OPEN of S18), the process proceeds to step S19. Similar to the above-mentioned step S16, it is determined in step S18 whether the bucket 6 of the shovel is in operation. If it is determined in step S19 that the bucket 6 is in operation (YES of step S19), the process proceeds to step S2 in which a process of setting the maximum output of the hydraulic pump 14 to the first output (low output) is performed. On the other hand, if it is determined in step S19 that the bucket 6 is not in operation (NO of step S19), the process proceeds to step S7 in which a process of setting the maximum output of the hydraulic pump 14 to the second output (high output) is performed.

If it is determined in step S18 that the arm 5 of the shovel is in an aim closing operation (CLOSE of S18), the process proceeds to step S20. Similar to the above-mentioned step S16, it is determined in step S20 whether the bucket 6 of the shovel is in operation. If it is determined in step S20 that the bucket 6 is in operation (YES of step S20), the process proceeds to step S2 in which a process of setting the maximum output of the hydraulic pump 14 to the first output (low output) is performed. On the other hand, if it is determined in step S20 that the bucket 6 is not in operation (NO of step S20), the process proceeds to step S7 in which a process of setting the maximum output of the hydraulic pump 14 to the second output (high output) is performed.

On the other hand, if it is determined in step S18 that the arm 5 of the shovel is not in operation (OFF of S18), the process proceeds to step S21. In step S21, similar to the abovementioned step S16, it is determined whether the bucket 6 of the shovel is in operation. If it is determined in step S21 that the bucket 6 of the shovel is in operation (YES of step S21), the process proceeds to step S7 in which a process of setting the maximum output of the hydraulic pump 14 to the second output (high output) is performed. On the other hand, if it is determined in step S21 that the bucket 6 of the shovel is not in operation (NO of step S21), the process proceeds to step S2 in which a process of setting the maximum output of the hydraulic pump 14 to the first output (low output) is performed as mentioned above.

Here, a description is given of a case where the above-mentioned hydraulic output control process is applied to the above-mentioned excavation and loading operation illustrated in FIG. 10. In the boom down turning operation illustrated in FIG. 10-(a), first in step S1, it is determined in step S1 that the shovel is not traveling, and the process proceeds to step S3. Then, it is determined in step S3 that the upper-part turning body 3 is turning, and the process proceeds to step S2 in which the output of the hydraulic pump 14 is set to the low output. In the boom down turning operation, the boom 4 performs the moving down operation and the arm 5 is not in operation and the bucket 6 is also not in operation. As explained above, in the boom down turning operation, a condition is set in which only the boom cylinder 7 among a plurality of hydraulic cylinders is operated, but the turning hydraulic motor 2A among the hydraulic actuators is in operation. Thus, the output of the hydraulic pump 14 is not set to the high output, and is set to the low output. Additionally, in the boom down turning operation, because the operation of moving down the boom 4 according to the gravity is merely performed, and there is no need to generate a large force by the hydraulic cylinder, if the output of the hydraulic pump 14 is set to the low output, it does not cause a problem in the operation of the shovel.

In the excavating operation illustrated in FIG. 10-(b) and (c), first, it is determined in step S1 that the shovel is not traveling, and the process proceeds to step S3. Then it is determined in step S3 that the upper-part turning body 3 is not turning, and the process proceeds to step S14. It is determined in step S14 that the boom 4 is performing the boom up operation, and the process proceeds to step S15. It is determined in step S15 that the arm 6 is performing the arm closing operation, and the process proceeds to step S7 in which the output of the hydraulic pump 14 is set to the high output. In the excavating operation, because the boom 4 performs the boom up operation and the arm 5 performs the arm opening operation, the boom cylinder 7 and the arm cylinder 8 must be driven among the hydraulic cylinders. Here, the excavating operation is a work to scrape an earth or a heavy material, and there is a case in which a large force is needed. Thus, in the excavating operation, the output of the hydraulic pump 14 is set to the high output. Additionally, because the boom down operation performed subsequent to the excavating operation is an operation to set the output of he hydraulic pump 14 to the low output as mentioned later, even if the output of the hydraulic pump 14 is set to the high output in the excavating operation, a period during which the output of the hydraulic pump 14 is set to the high output is a short period of time (only during the excavating operation) and an excessive load to the engine 11 and the drive of the motor generator 12 by the discharge of the battery 19 do not last for a long time. Also in this viewpoint, if the output of the hydraulic pump 14 is set to the high output during the excavating operation, there is no problem in the operation of the shovel.

Then, in the boom up turning operation illustrated in FIG. 10-(*d*), first, it is determined in step S1 that the shovel is not traveling, and the process proceeds to step S3. Then it is determined in step S3 that the upper-part turning body 3 is turning, and the process proceeds to step S2 in which the output of the hydraulic pump 14 is set to the low output. In the boom up turning operation, the boom 4 performs the boom up operation and the aim 5 is not in operation and the bucket 6 is also not in operation or performing a closing operation. Although only the boom cylinder 7 is operated among the plurality of hydraulic cylinders in the boom up turning operation as mentioned above, the output of the hydraulic pump 14 is not set to the high output but set to the low output because the turning hydraulic motor 2A is operated from among the hydraulic actuators. Additionally, because the operation of moving up the boom 4 is merely performed against the gravity in the boom down turning operation and there is no need to generate an especially large force by the hydraulic cylinder, if the output of the hydraulic pump 14 is set to the low output, there is no problem caused in the operation of the shovel.

Next, in the dump operation illustrated in FIG. 10-(*e*), first, it is determined in step S1 that the shovel is not traveling, and the process proceeds to step S3. Then it is determined in step S3 that the upper-part turning body 3 is not turning, and the process proceeds to step S14. It is determined in step S14 that the boom 4 is not in operation or performing a boom down operation, and the process proceeds to step S18. It is determined in step S18 that the aim 5 is performing an opening operation, and the process proceeds to step S19. It is determined in step S19 that the bucket 6 is performing a bucket opening operation, and the process proceeds to step S2 in which the output of the hydraulic pump 14 is set to the low output. Because the bucket cylinder 9 alone is operated in the dump operation and there is no need to generate an especially large force by the hydraulic cylinder, if the output of the hydraulic pump 14 is set to the low output, there is no problem caused in the operation of the shovel.

As explained above, in the present embodiment, the setting of the output of the hydraulic pump is changed according to the operating direction of the hydraulic actuator as is in step S14, step S15 and step S18, and, thus, an appropriate output setting can be made in accordance with various kinds of operating condition. Specifically, the output of the hydraulic pump 14 is set in accordance with the driving direction of the boom cylinder 7 in step S14, and the output of the hydraulic pump 14 is set in accordance with the driving direction of the arm cylinder 8 in steps S15 and S18.

In addition, although the upper-part turning body 3 is configured to be turned by being driven by the turning hydraulic motor 2A as illustrated in FIG. 2 in the above-mentioned second embodiment, the upper-part turning body 3 may be configured to turn by being driven by an electric motor. In this case, as illustrated in FIG. 9, the turning electric motor 21 as the electric motor is provided instead of the hydraulic motor 2A for driving the upper-part turning body 3. The turning electric motor 21 is connected to the electric power accumulation system 100 via an inverter 18C. An electric power is supplied from the electric power accumulation system 100 to the turning electric motor 21 via the inverter 18C, and the turning mechanism 2 is driven by the turning electric motor 21 to turn the upper-part turning body 3. When the turning electric motor 21 reduces a speed, the turning electric motor 21 is caused to perform a regenerating operation, and an electric power generated may be accumulated in the electric power accumulation system 100 via the inverter.

When driving the upper-part turning body 3 by the turning electric motor 21 as illustrated in FIG. 9, there is no need to determine in step S3 whether the upper-part turning body 3 of the shovel is turning in the output control process of the hydraulic pump illustrated in FIG. 4, and step S3 is omitted. Accordingly, the ON/OFF determination part 41B, which performs a determination of ON/OFF of the turning operation lever in FIG. 5.

The present invention is not limited to the specifically disclosed embodiments, and various variations and modifications may be made without departing from the scope of the present invention.

The present application is based on Japanese Patent Application No. 2008-203518 filed on Aug. 6, 2008, the entire contents of which are incorporated herein by reference.

INDUSTRIAL APPLICABILITY

The present invention is applicable to a hybrid-type construction machine in which an engine driving a hydraulic pump is assisted by an electric motor.

EXPLANATION OF REFERENCE NUMERALS 1 lower-part running body
1A, 1B running mechanism
2 turning mechanism
2A turning hydraulic motor
3 upper-part turning body
4 boom
5 arm
6 bucket
7 boom cylinder
8 arm cylinder
9 bucket cylinder
10 cabin
11 engine
12 motor generator
13 transmission machine (splitter)
14 variable-volume-type hydraulic pump
16 hydraulic line
17 control valve
18A, 18C inverter
19 battery
21 turning electric motor
27 electric power line
30 controller
41A, 413, 41C, 41D, 41E ON/OFF determination part
42 operation determination part
100 electric power accumulation part
110 DC bus

The invention claimed is:
1. A hybrid-type construction machine, comprising:
an engine to drive a variable-volume-type hydraulic pump;
a plurality of hydraulic actuators driven by a hydraulic pressure from the variable-volume-type hydraulic pump; and
a motor generator driven by an electric power from an electric power accumulator to assist the engine,
wherein a maximum output of said variable-volume-type hydraulic pump is equal to or larger than a maximum output of said engine, and when operating by setting an output of said variable-volume-type hydraulic pump larger than the maximum output of said engine, said engine is assisted by said motor generator.

2. The hybrid-type construction machine as claimed in claim 1, wherein in a case where the hydraulic actuator to be driven is a hydraulic actuator capable of performing a continuous operation, the output of said variable-volume-type hydraulic pump is set to a first output equal to or smaller than the maximum output of said engine.

3. The hybrid-type construction machine as claimed in claim 1, wherein in a case where the hydraulic actuator to be driven is a hydraulic cylinder, the output of said variable-volume-type hydraulic pump is set to a second output larger than the maximum output of said engine.

4. The hybrid-type construction machine as claimed in claim 1, wherein an output of said variable-volume-type hydraulic pump is set based on presence or absence of an operation of each of said hydraulic actuators.

5. The hybrid-type construction machine as claimed in claim 1, wherein in a case where only one of said hydraulic actuator is operating, an output of said variable-volume-type hydraulic pump is set to a second output larger than the maximum output of said engine.

6. The hybrid-type construction machine as claimed in claim 1, wherein an output of said variable-volume-type hydraulic pump is set based on a driving direction of each of said hydraulic actuators.

7. The hybrid-type construction machine as claimed in claim 1, including a boom and an arm driven by said hydraulic actuators, wherein an output of said variable-volume-type hydraulic pump is set based on driving directions of said boom and said arm.

8. The hybrid-type construction machine as claimed in claim 1, wherein in a case where said hydraulic actuators are not driven, an output of said variable-volume-type hydraulic pump is set to a value smaller than the maximum output of said engine.

9. The hybrid-type construction machine as claimed in claim 1, wherein a kind and an operating condition of said hydraulic actuators are determined based on a lever operation of an operator.

10. A control method of a hybrid-type construction machine, the hybrid-type construction machine including:
   an engine to drive a variable-volume-type hydraulic pump;
   a plurality of hydraulic actuators driven by a hydraulic pressure from the variable-volume-type hydraulic pump; and
   a motor generator driven by an electric power from an electric power accumulator to assist the engine,
   the control method comprising:
   setting a maximum output of said variable-volume-type hydraulic pump to be equal to or larger than a maximum output of said engine; and
   assisting said engine by said motor generator when operating said hybrid-type construction machine by setting an output of said variable-volume-type hydraulic pump larger than the maximum output of said engine.

11. The control method as claimed in claim 10, wherein in a case where the hydraulic actuator to be driven is a hydraulic actuator capable of performing a continuous operation, the output of said variable-volume-type hydraulic pump is set to a first output equal to or smaller than the maximum output of said engine.

12. The control method as claimed in claim 10, wherein in a case where only one of said hydraulic actuator is operating, the output of said variable-volume-type hydraulic pump is set to a second output larger than the maximum output of said engine.

13. The control method as claimed in claim 10, wherein an output of said variable-volume-type hydraulic pump is set based on a driving direction of each of said hydraulic actuators.

* * * * *